United States Patent [19]

Lademann et al.

[11] 3,769,698

[45] Nov. 6, 1973

[54] METHOD OF MANUFACTURING A PHOTOETCHED INDUCTION COIL

[75] Inventors: Ernest E. Lademann, Park Ridge; James J. O'Connor, Old Bridge, both of N.J.

[73] Assignee: The Bendix Corporation, Teterboro, N.J.

[22] Filed: Dec. 26, 1972

[21] Appl. No.: 317,999

Related U.S. Application Data

[62] Division of Ser. No. 240,081, March 31, 1972, Pat. No. 3,736,543.

[52] U.S. Cl. .................... 29/602, 336/96, 336/200, 336/232

[51] Int. Cl. .................... H01f 7/06

[58] Field of Search .................... 29/598, 602, 605; 336/200, 205, 232, 96

[56] References Cited

UNITED STATES PATENTS

| | | | |
|---|---|---|---|
| 3,011,247 | 12/1961 | Hanlet | 29/602 |
| 3,504,276 | 3/1970 | Proctor et al. | 336/200 X |
| 3,587,019 | 6/1971 | Bull et al. | 336/200 |
| 3,084,420 | 4/1963 | Burr et al. | 29/602 X |

*Primary Examiner*—Charles W. Lanham
*Assistant Examiner*—Carl E. Hall
*Attorney*—Anthony F. Cuoco

[57] ABSTRACT

An induction coil assembly includes circuits photoetched on metallic laminates bonded to a flexible substrate. The substrate is wound on an arbor and pinned, after which it is removed from the arbor, impregnated and machined to provide an induction coil having close mechanical and electrical tolerances.

6 Claims, 8 Drawing Figures

METHOD OF MANUFACTURING A PHOTOETCHED INDUCTION COIL

This is a divisional of application Ser. No. 240,081, filed Mar. 31, 1972, now U.S. Pat. No. 3,736,543.

BACKGROUND OF THE INVENTION

1. Field of the Invention

This invention relates to induction coils of the type used in gyro torquer assemblies and, more particularly, to induction coils of the type described having photoetched circuitry.

2. Description of the Prior Art

Prior to the present invention, induction coils were hand wound. The coil so provided was then encapsulated and machined as required. It is difficult and costly to control mechanical and electrical tolerances within limits required for modern applications when providing induction coils in this manner.

SUMMARY OF THE INVENTION

The present invention contemplates an induction coil assembly having circuitry in the form of a geometric pattern of conductive metal photoetched in a planar arrangement on a flexible substrate. The flexible substrate is wound on an arbor, with locating tabs being provided on the substrate to insure predetermined spacing between windings. A registration pin is inserted through the tabs to prevent the substrate from unwinding, after which the wound substrate is removed from the arbor, vacuum impregnated to fill the voids between and around the windings and machined as required.

One object of this invention is to provide an induction coil having photoetched circuitry.

Another object of this invention is to provide an induction coil of the type described whereby electrical characteristics can be predetermined with a high degree of repeatability.

Another object of this invention is to provide a method for manufacturing an induction coil of the type described which permits greater control of manufacturing tolerances than has heretofore been possible.

Another object of this invention is to manufacture an induction coil of the type described at a lower cost than has heretofore been possible.

The foregoing and other objects and advantages of the invention will appear more fully hereinafter from a consideration of the detailed description which follows, taken together with the accompanying drawings wherein one embodiment of the invention is illustrated by way of example. It is to be expressly understood however, that the drawings are for illustration purposes only and are not to be construed as defining the limits of the invention.

DESCRIPTION OF THE INVENTION

Figure 1:
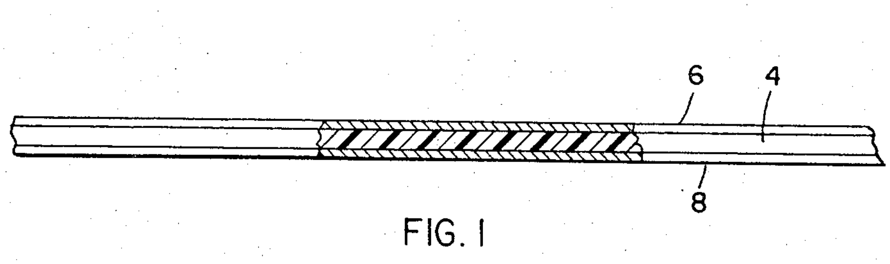
FIG. 1 is a partially sectioned side view of a flexible substrate according to the invention and having metallic laminations on either side thereof.

FIG. 1 shows a flexible, continuous substrate 4 having metallic laminations 6 and 8 on either side thereof. Substrate 4 may be a suitable polyimide plastic such as that carrying the trade name Kapton and marketed by Du Pont Company Company, and is approximately 0.002 inches thick. Laminations 6 and 8 may be one ounce copper strips (0.0014 inches thick) suitably bonded to substrate 4 as is well known in the art.

Figure 2:
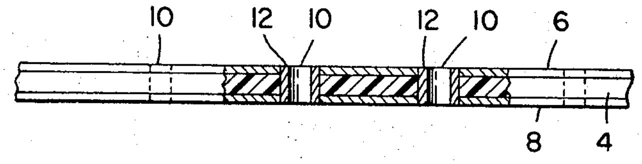
FIG. 2 is a partially sectioned side view showing the flexible laminated substrate of FIG. 1 with plated through holes for electrically connecting the metallic laminations.

Holes 10 are drilled through substrate 4 and metallic laminations 6 and 8 at predetermined locations along the length thereof as shown in FIG. 2. The holes are then conventionally plated through with a suitable conductive material such as copper, with plated through holes 20 thereby providing electrical connections between metallic laminations 6 and 8.

Figure 3:
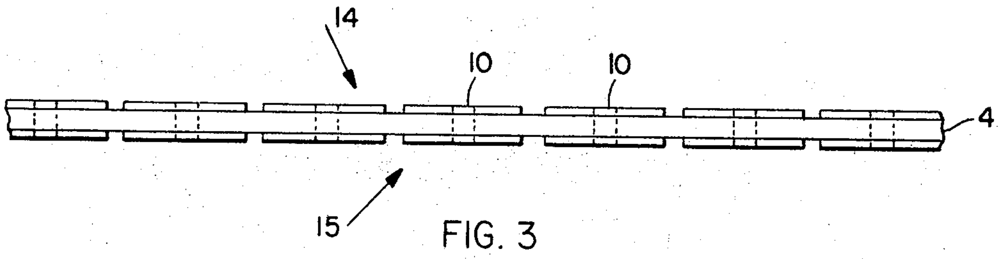
FIG. 3 is a side view showing the flexible laminated substrate of FIGS. 1 and 2 having circuit patterns etched on the metallic laminations.

Laminations 6 and 8 are etched by conventional photochemical methods to provide circuit patterns designated by the numerals 14 and 15, respectively, as shown in FIG. 3. Plated through holes 10 connect circuit patterns 14 and 15 as shown in the figure.

Figure 5:
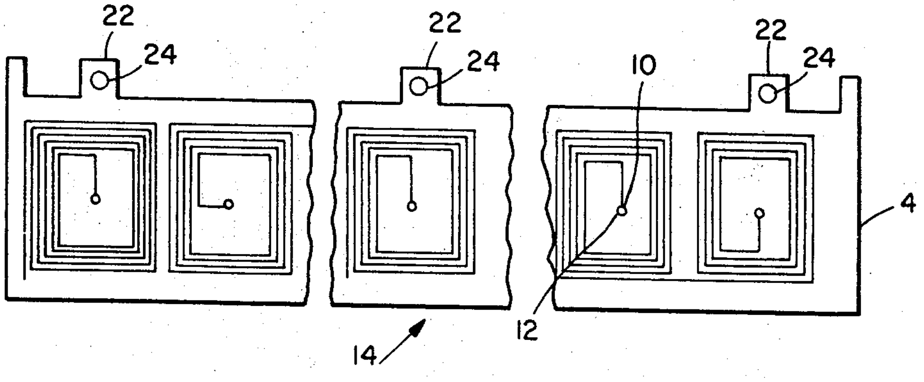
FIG. 5 is a top view of the etched flexible laminated substrate.

Thus, as seen in FIG. 5, circuit pattern 14 includes a single planar coil 16 and a pair of connected planar coils 17 and 18, with the pattern, i.e., a single coil and a pair of connected coils, being repeated along the length of substrate 4. Circuit pattern 15 includes a repeatable pattern of a pair of connected coils 19 and 20 and a single coil 21. Single coil 16 in circuit 14 is connected by a plated through hole 10 to coil 19 in circuit 15. Another plated through hole 10 connects coils 17 and 20 while still another plated through hole 10 connects coils 18 and 21. It will now be understood that in this manner a continuous electrical circuit is provided along the length of substrate 4.

The completed photoetched substrate has a configuration as shown in FIG. 5, wherein only circuit 14 is shown. Substrate 4 further includes locating tabs 22 which are positioned to allow a space of approximately 0.002 inches between windings when the substrate is wound on an arbor and the tabs aligned as will be hereinafter explained. Tabs 22 have holes 24 therethrough to accommodate a registration pin 28 shown in FIG. 7.

Figure 6:
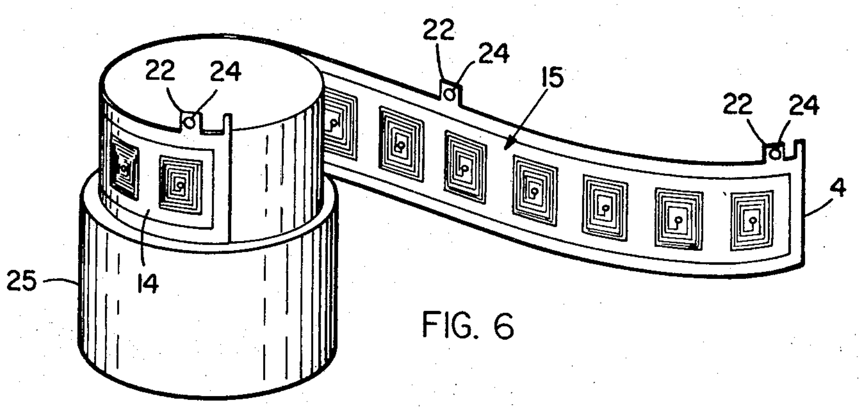
FIGS. 6, 7 and 8 are pictorial representations showing the laminated substrate of FIGS. 1–5 wound on an arbor and machined to provide a final induction coil in accordance with the invention.
Figure 7:
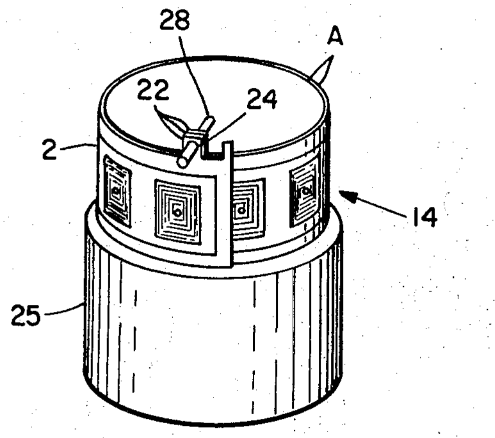

As shown in FIG. 6, photoetched substrate 4 is wound on an arbor 25. Locating tabs 22 are positioned to allow the aforenoted 0.002 inch sace between windings when the substrate is wound on the arbor and the tabs aligned as shown in FIG. 7, with the space between windings carrying the description A. Registration pin 28 is inserted through holes 24 in tabs 22 to prevent the substrate from unwinding as will now be understood.

Figure 8:
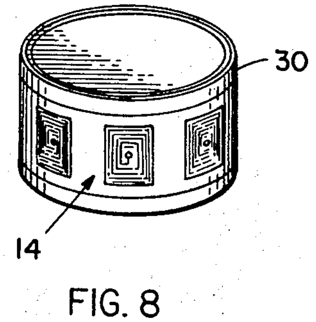

After substrate 4 has been wound and pinned, the assembly is removed from arbor 25 and vacuum impregnated so as to fill the voids between and around the layers with a suitable insulating material 30 such as an epoxy resin as shown in FIG. 8. After vacuum impregnation has been completed, locating tabs 20 and pin 28 are sheared off and the inner and outer diameters of the assembly are machined as required to provide a finished coil assembly as showin in FIG. 8.

Figure 4:
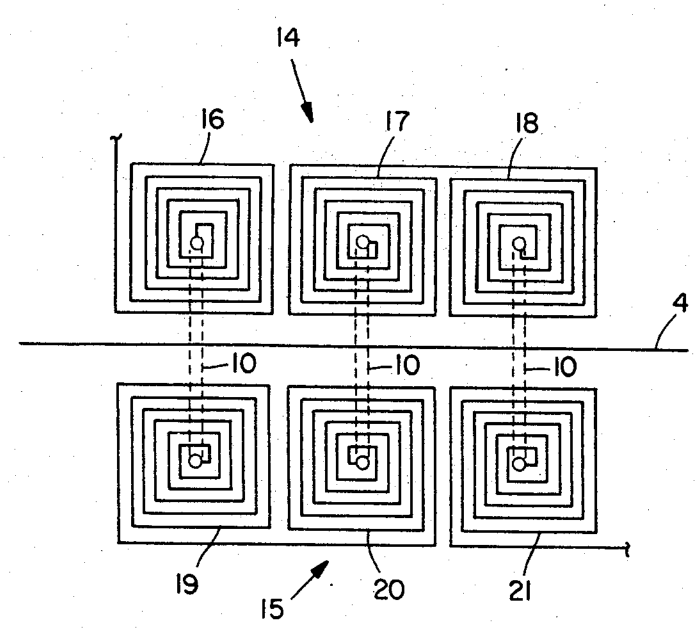
FIG. 4 is a diagrammatic representation showing the geometric form of the etched circuit patterns, with said patterns being connected by the plated through holes.

It will now be seen that an induction coil having the configuration shown in the drawings and manufactured by the method described has certain advantages. First, since circuits 14 and 15 are photographically produced, each and every coil 16–21 (FIG. 4) will be precisely the same. Thus, inductor widths and conductor spacing can be controlled to the extent that electrical characteristics such as impedance and capacitance can be predetermined with excellent repeatability. Also the photoetching process lends itself to greater control of manufacturing tolerances. Due to the good repeatability and dimensional control, gaps can be reduced with a subsequent increase in torque being thus provided when a torquer application is intended. Finally, a coil assembly manufactured according to the invention can be achieved at a cost greatly reduced from that required for coil assemblies manufactured as now known in the art.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A method for manufacturing a coil assembly comprising:

providing a continuous, flexible substrate;

applying conductive circuit patterns to both sides of the substrate;

connecting the circuit patterns on one side of the substrate with those on the other side;

winding the substrate having the connected circuit patterns thereon into a coil having a plurality of turns with predetermined spaces between said turns; and impregnating the wound coil to fill said spaces with an insulating material.

2. A method as described by claim 1, wherein the step of applying conductive circuit patterns to both sides of the substrate includes:

laminating both sides of the substrate with a conductive metal; and photoetching the circuit patterns on the metallic laminations.

3. A method as described by claim 2, wherein the step of connecting the circuit patterns on the one side of the substrate with those on the other side includes:

drilling holes through the laminated substrate along the length thereof;

plating the through holes with a conductive metal; and photoetching the circuit patterns so that said patterns on one side of the substrate are connected by the plated through holes to the patterns on the other side.

4. A method as described by claim 1 which also includes:

providing locating tabs at predetermined points along the length of the substrate; and winding the substrate on an arbor with the locating tabs in alignment for providing said spaces.

5. A method as described by claim 4, including:

drilling holes through the locating tabs;

inserting a pin through the holes to prevent unwinding when the substrate is wound on the arbor with the locating tabs in alignment; and removing the pinned, wound coil from the arbor prior to impregnating.

6. A method as described by claim 5, including:

removing the pin and locating tabs and machining the coil after impregnating.

* * * * *